(12) United States Patent
Cheng et al.

(10) Patent No.: US 6,954,612 B2
(45) Date of Patent: Oct. 11, 2005

(54) ENHANCED HONEYCOMB COMMUNICATION SYSTEM

(75) Inventors: Ray-Guang Cheng, Keelung (TW); Phone Lin, Tainan (TW); Yi-Bing Lin, Taichung (TW)

(73) Assignee: Benq Corporation, Taoyuan (TW)

( * ) Notice: Subject to any disclaimer, the term of this patent is extended or adjusted under 35 U.S.C. 154(b) by 384 days.

(21) Appl. No.: 10/163,413

(22) Filed: Jun. 7, 2002

(65) Prior Publication Data

US 2002/0187746 A1 Dec. 12, 2002

(30) Foreign Application Priority Data

Jun. 8, 2001 (TW) .................................. 90114011 A

(51) Int. Cl.[7] .............................................. H04B 7/15
(52) U.S. Cl. ...................... 455/11.1; 455/9; 455/414.1; 455/425; 455/432.1; 370/338
(58) Field of Search ........................ 455/11.1, 9, 414.1, 455/414.3, 422.1, 425, 432.1, 445; 370/338

(56) References Cited

U.S. PATENT DOCUMENTS

| | | | | |
|---|---|---|---|---|
| 5,983,072 A | * | 11/1999 | Schroderus | 455/11.1 |
| 6,055,429 A | * | 4/2000 | Lynch | 455/445 |
| 6,424,818 B1 | * | 7/2002 | Hirono | 455/11.1 |
| 6,574,453 B1 | * | 6/2003 | Honda et al. | 455/11.1 |

FOREIGN PATENT DOCUMENTS

| | | |
|---|---|---|
| CN | 1255261 A | 5/2000 |
| CN | 1304619 A | 7/2001 |

* cited by examiner

Primary Examiner—Nick Corsaro
Assistant Examiner—Shaima Q. Aminzay
(74) Attorney, Agent, or Firm—Rabin & Berdo, P.C.

(57) ABSTRACT

A method of relay transmission in a mobile communication system. The mobile communication system includes at least one base station and a plurality of user equipment units (UEs). When one of the UEs attempts to send a message to the base station, this one of the UEs, referred to as a requesting UE, is capable of using the method of relay transmission to send messages to the base station via another one or more UEs, referred to as relay UEs. The method of relay transmission includes the following steps. First, a relay request confirmation procedure for the requesting UE and the relay UE is performed. Second, a base station confirmation procedure for the requesting UE, the relay UE, and the base station is executed. Next, an identity authentication procedure for the requesting UE, the relay UE, and the base station is performed. After that, a relay start confirmation procedure for the requesting UE and the relay UE is executed. Finally, a relay transmission procedure for the requesting UE, the relay UE, and the base station is performed, wherein the requesting UE sends the message to the base station via the relay UE. According to the invention, high data rate transmission can be achieved even if the requesting UE is distant from the base station, and thus communication quality can be improved, with a reduced cost.

20 Claims, 12 Drawing Sheets

ENHANCED HONEYCOMB COMMUNICATION SYSTEM

This application incorporates by reference Taiwan application Serial No. 090114011, filed on Jun. 8, 2001.

BACKGROUND OF THE INVENTION

1. Field of the Invention

The invention relates in general to a method for signal transmission and more particularly to a method of relaying messages in a mobile communication system.

2. Description of the Related Art

Mobile communication devices such as mobile phones are small and portable. People can communicate each other nearly anytime and anywhere. In addition, in the near future, notebook computers and personal digital assistants (PDAs) will be integrated into the mobile communication devices, so as to provide much more convenience.

FIG. 1 shows a conventional cellular mobile communication system 100. The service area of the cellular mobile communication system 100 is divided into a number of adjacent regions known as cells 101. The cells 101 are equipped with respective base stations (node-B) 102. Base stations 102 can communicated with user equipment unit (UE 103) when UE 103 stays in the service area of base station 102. UE 103 is assigned a dedicated identification (e.g. International Mobile Subscriber Identity, IMSI), and must submit the registration of the UE 103 for communication services, immediately after start-up, to a particular base station associated with the cell that the UE 103 is within. After that, the registered UE 103 can communicate through the base station only. In other words, the base stations 102 should know the updated information about the user equipment units of the subscribers staying in the service coverage of the associated base stations 102, and transmit messages to and receive messages from the user equipment units, such as the UE 103. The base stations 102 are connected to radio network controllers (RNC) 104(1) as shown in FIG. 1. In addition, a number of adjacent RNCs are connected to a mobile switching center (MSC) 104(2) (or a serving GPRS supported node (SGSN), wherein GPRS stands for general packet radio service). Through gateway mobile switching centers (GMSCs) 104 (or gateway GPRS supported nodes, GGSNs), the mobile communication network is connected to a public switched telephone network (PSTN) 106 in the local area. The PSTN 106 is a public communication network that combines fixed networks and radio networks.

FIG. 2 illustrates a conventional cellular mobile communication system and the communication procedure of UE 201 in the communication system. When UE 201 wants to send messages to another UE 201(1), the UE 201 transmits the messages by wireless link to a base station 203. The base station 203 transmits received messages to an RNC 204(1). The messages will be received by PSTN 206 through MSC 204(2) and GMSC 204(3). PSTN 206 will transfer the messages to a base station 203(1) via a GMSC 204(3), MSC 204(2), and RNC 204(1). The base station 203(1) will forward the received messages to UE 201(1) by wireless transmission. Likewise, according to the data transmission process, the UE 201 receives the message sent from the other UE, by the base station 203 of the cell 202 which the UE 201 is within.

In a wireless communication system, if the wireless transmission distance becomes longer, the signal distortion occurred in communication becomes more significant. If the coverage areas of some cells include barriers or protrusions, such as hills or tall buildings, the radio waves may be unable to penetrate these natural or man-made barriers. Besides, the radio waves may be reflected by the protrusions, and the original radio waves may be affected by destructive interference due to the reflected radio waves, thus resulting in signal distortion or noise interference to be more significant. Therefore, the wireless link between the UE 201 and the base station 203 might be affected by some barriers, and the quality of signals will be degraded and the strength of the received signals will even be dropped to be undetectable. More specifically, the carrier-to-interference ratio (C/I ratio) of each connection should be greater enough to support the required Frame Error Rate (FER).

By definition, the C/I ratio of a connection is proportional to the energy used per bit. The energy used per bit depends on the service rate and the transmission power of the connection. It means that we can increase the SIR of a connection by decreasing the service rate of a connection to combat with bad traffic environments. On the other hand, the service rate can be increased while under good traffic environments. In other words, the data rate for the UE 201 and base station 203 is related to the communication quality between UE 201 and the base station 203, wherein the communication quality is indicative of received signal power, interference from noise, and the degree of a distortion of signal.

FIG. 3A illustrates that UE 303 transmits a message to base station 302 in cell 301. If the coverage area of the cell 301 is too large, some portions of the cell 301 may be distant from the base station 302. If the UE 303 proceeds to communicate in such portions of the cell 301, data rate of data signals and voice communication quality would be affected. FIG. 3B illustrates that the UE 303 transmits a message to the base station 302, when a barrier, such as a hill or a tall building, exists in the cell 301. For example, a hill 304 exists between the UE 303 and the base station 302, as shown in FIG. 3B. Because the base station 302 and the UE 303 are separated by the hill 304, the received signals will be degraded in quality and the strength of the received signals will even be dropped to be undetectable.

In order to provide services with higher data rates, a conventional approach is to install additional base stations such that a cell is partitioned into a number of microcells. FIG. 4A illustrates a number of microcells 402 for wireless transmission, wherein microcells 402 are of the cell 401 and each of the microcells 402 has respective coverage area smaller than that of the cell 401. For a microcell that can communicate to a UE within the microcell's base station, the maximum allowable data rate from the UE 404 to the base station 403 of the microcell 402 is greater than that of the cell 401. If there is a barrier such as a hill 405 between the UE 404 and the cell 401, as illustrated in FIG. 4B, the communication between them would be hindered. If the approach that the cell 401 is subdivided into the microcells 402 is used, the influence of the barrier on the data transmission can be reduced to a minimum level.

Unfortunately, the conventional approach to dividing a cell into a number of smaller cells has the following disadvantages. First, the microcell may introduce additional costs due to the increase of base stations. Furthermore, it may not be applicable for rural and sub-urban areas due to the low subscriber density.

SUMMARY OF THE INVENTION

It is therefore an object of this invention to provide a method of relay transmission in a mobile communication system in order to improve communication efficiency and quality, save the cost, and increase the economic benefits.

The invention achieves the above-identified object by providing a method of relay transmission in a mobile communication system. The mobile communication system includes at least one base station and a plurality of user equipment units (UEs). When one of the UEs attempts to send a message to the base station, this UE, referred to as a requesting UE, is capable of using the method of relay transmission to send the message to the base station via another one of the other UEs, where the another one of the UEs is referred to as a relay UE. The relay UE should be located between the requesting UE and the base station such that the data rate provided by the relayed link can be higher than the direct link between the requesting UE and the base station. The method of relay transmission includes the following steps. First, a relay request confirmation procedure between the requesting UE and the relay UE is performed so as to confirm that the requesting UE is able to send the message via the relay UE. Second, a base station confirmation procedure for the requesting UE, the relay UE, and the base station is executed so as to confirm that the base station permits the requesting UE to send the message via the relay UE to the base station. Next, an identity authentication procedure for the requesting UE, the relay UE, and the base station is performed so as to establish a relay channel. After that, a relay start confirmation procedure for the requesting UE and the relay UE is executed so as to confirm that a relay transmission procedure for the requesting UE and the relay UE can be started. Finally, the relay transmission procedure for the requesting UE, the relay UE, and the base station is performed, wherein the requesting UE sends the message to the base station via the relay UE.

Other objects, features, and advantages of the invention will become apparent from the following detailed description of the preferred but non-limiting embodiments. The following description is made with reference to the accompanying drawings.

DETAILED DESCRIPTION OF THE INVENTION

A UE that needs to send a message to a Node-B and activates the relay procedure is referred as a requesting UE. The message sent from the requesting UE is relayed by another UE to the Node-B, where the 'another UE' is referred as a relay UE. The principle of this invention is that messages sent from a requesting UE are relayed by one or more relay UEs to a base station (Node-B) to increase higher data rate compared to the conventional direct transmission method. In this invention, the relay UE may be a common UE such as a third-generation mobile phone, an in-car UE, or an antenna port of an extended Node-B.

As described above, the distance between a UE and a Node-B may affect the signal power received at the receiver end. The quality of communication between the UE and the Node-B can be evaluated according to the carrier to interference ratio (C/I ratio). According to the definition of C/I ratio, C is indicative of the signal strength of a carrier and I is indicative of the strength of interference, both of them are measured at the receiver end. For a given error rate requirement, a minimum C/I requirement should be guaranteed. As distance between the UE and the Node-B is reduced, the signal strength measured at the receiver end would be increased. For the same interference level, a larger C/I ratio can be achieved at the receiver side. For such case, the UE can send messages to the Node-B at a higher data rate based on the given minimum C/I requirement. On the contrary, the C/I would be reduced if the distance between the UE and Node-B is increased. The supported data rate is then reduced based on the given minimum C/I requirement.

Figure 1:
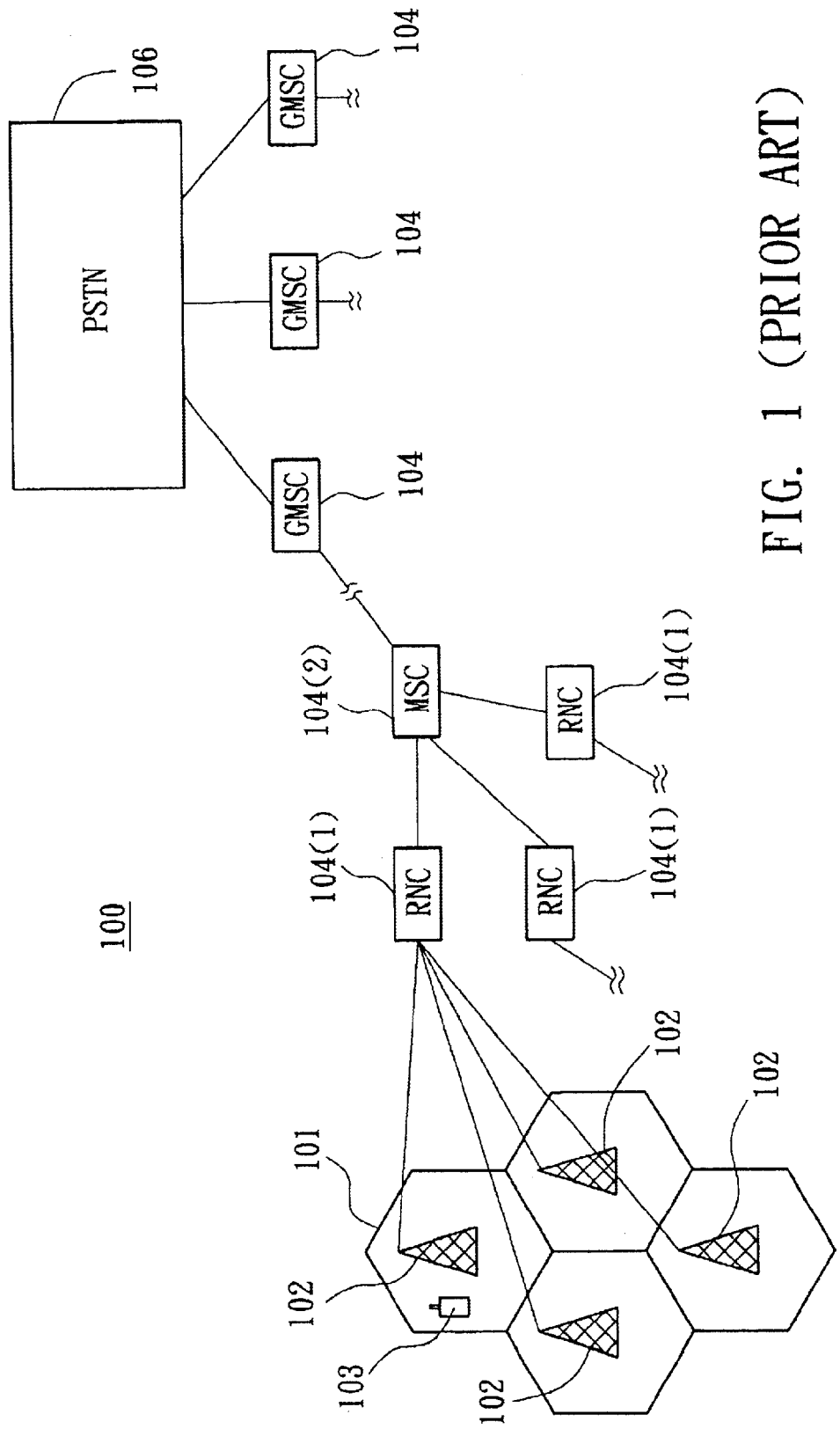
FIG. 1 (Prior Art) shows a conventional cellular mobile communication system.
Figure 2:
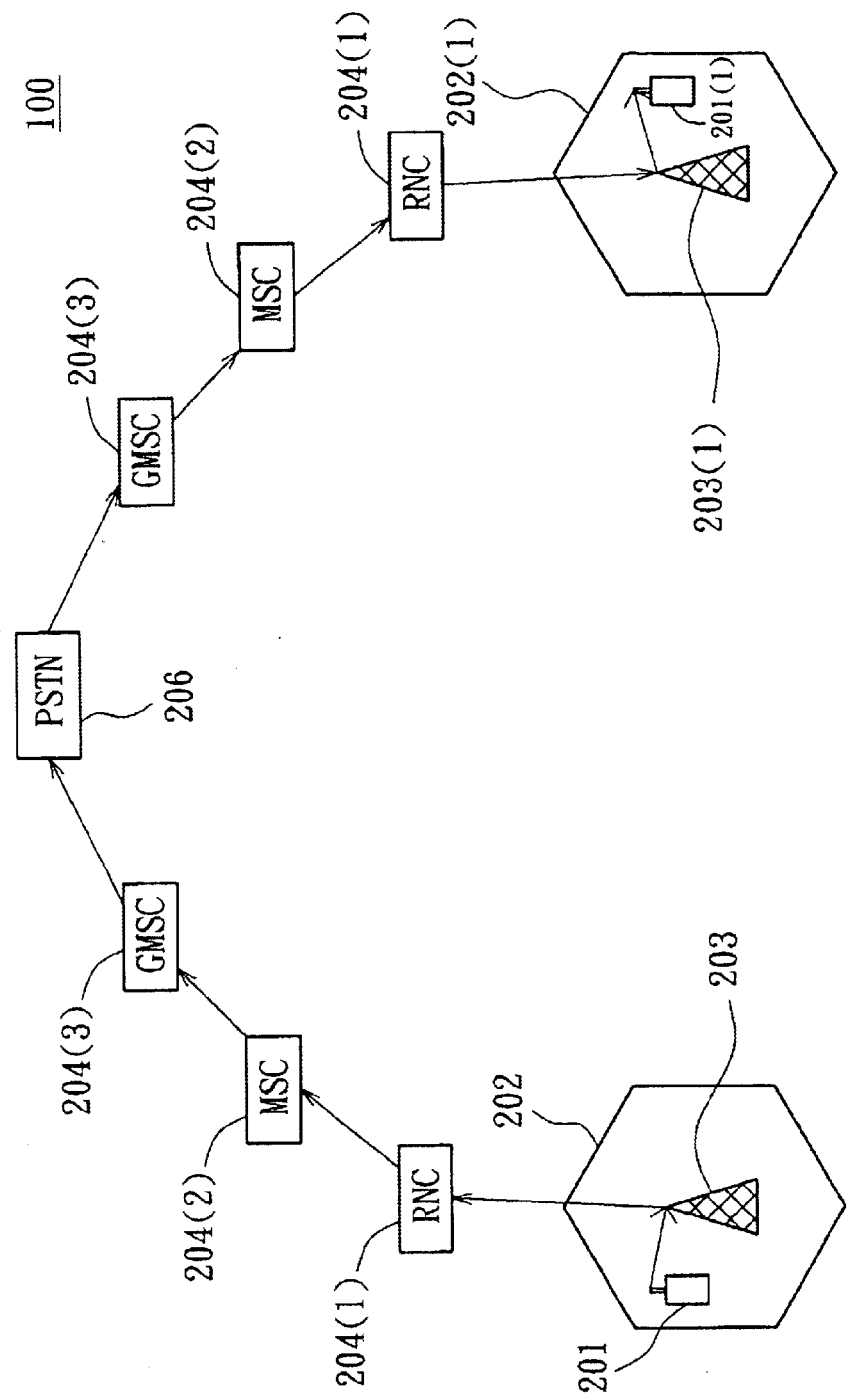
FIG. 2 (Prior Art) illustrates a process of transmitting and receiving messages between different user equipment units in the cellular mobile communication system.
Figure 3B:
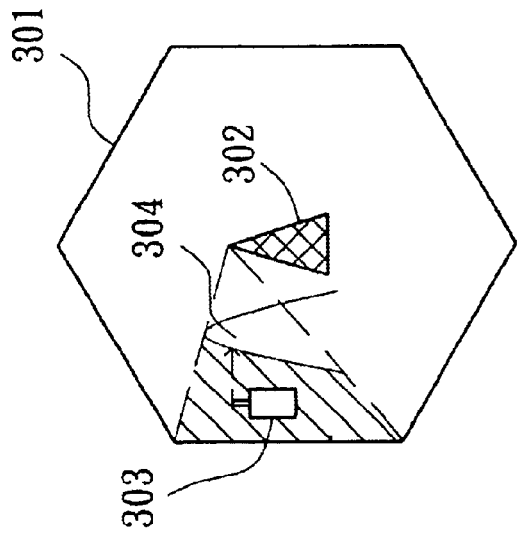
FIG. 3B (Prior Art) illustrates that the UE transmits a message to the base station when a barrier exists in the cell.
Figure 3A:
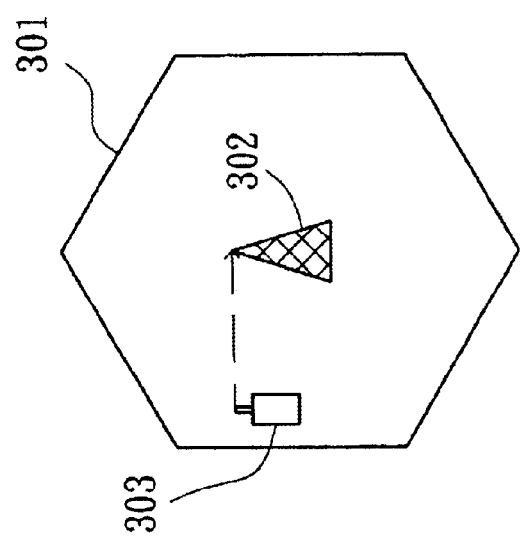
FIG. 3A (Prior Art) illustrates that a UE transmits a message to a base station in a cell.
Figure 4B:
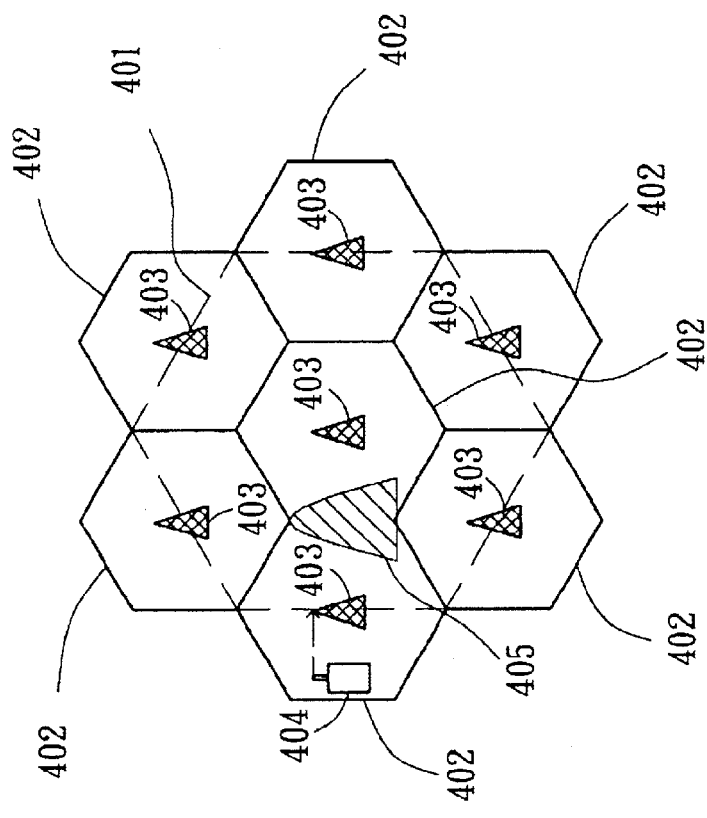
FIG. 4B (Prior Art) illustrates the wireless communication of a UE in a mobile communication system with a number of microcells where a barrier exists.
Figure 4A:
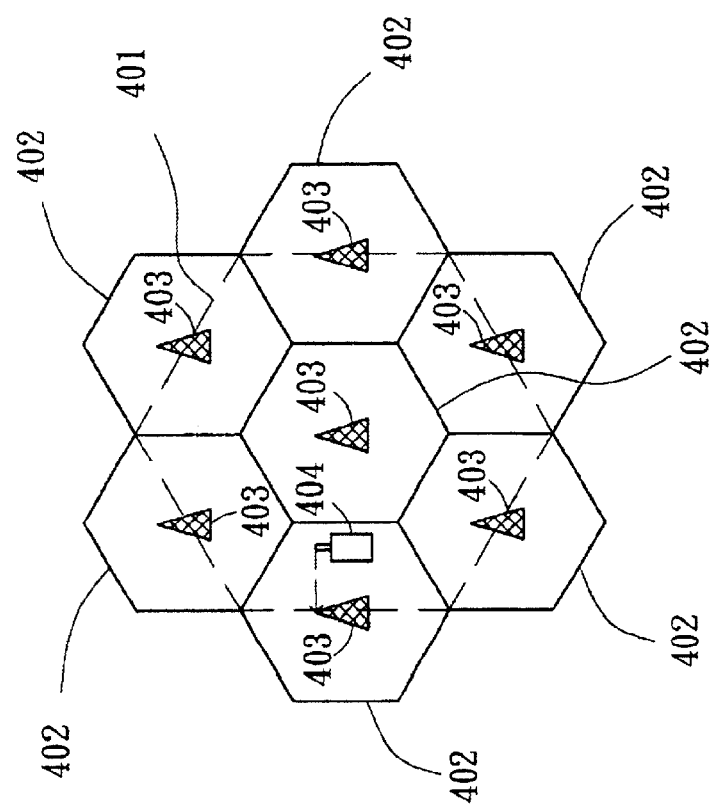
FIG. 4A (Prior Art) illustrates the wireless communication of a UE in a mobile communication system with a number of microcells.
Figure 5:
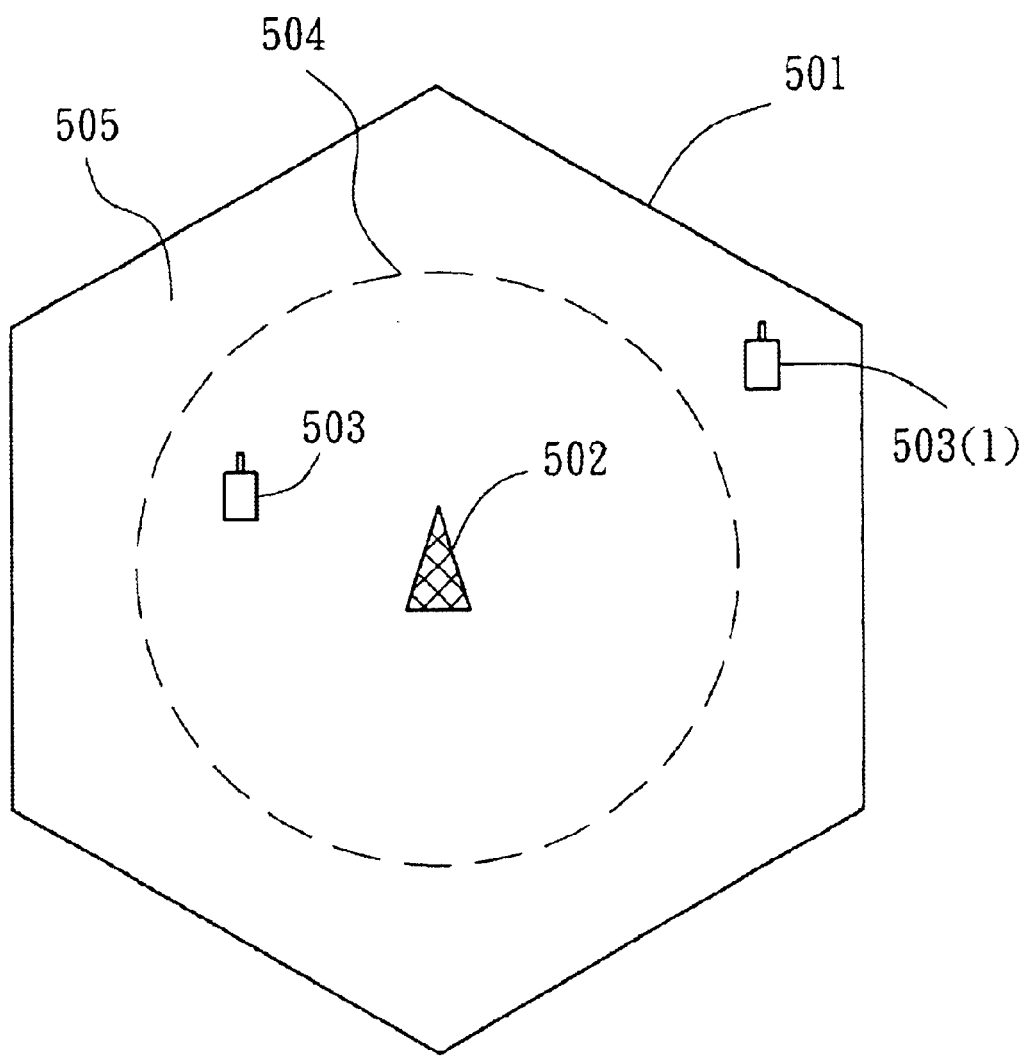
FIG. 5 shows a cell formed with a high bit rate coverage and a low bit rate coverage.

In a mobile communication system, for example, opportunity driven multiple access (ODMA) system, without loss of generality, each cell of a base station can be divided into a high bit rate region and a low bit rate region. FIG. 5 illustrates the cell 501 of a Node-B 502 divided into two regions in terms of the possible supported data rates: a high bit rate region 504 and a low bit rate region 505. In the system, for example, the division is performed according to the C/I ratio of a measurement signal received by a UE 503, wherein the Node-B 502 sends the measurement signal periodically. If the measurement signal has a C/I ratio greater than a threshold value, it indicates that the UE 503 is in the region that can provide the better communication quality in the cell 501. In this region, high bit rate direct data transmission can be achieved between the UE 503 and the Node-B 502. Therefore, the region is referred to as the high bit rate region (or H-region) 504. Conversely, if the measurement signal has a C/I ratio smaller than the threshold value, it indicates that the UE 503(1) is in the region that provides the worse communication quality. In this region, only low bit rate direct data transmission can be achieved between the UE 503(1) and the Node-B 502. Thus, the region is referred to as the low bit rate region (or L-region) 505. The criterion used in the division of the cell 501 into the H-region 504 and L-region 505, that is, the threshold value for C/I ratio, is predetermined by the mobile communication system. In fact, the mobile communication system is capable of dividing a cell into N+1 regions by determining N threshold values. In general, if barriers between the UE 503 and Node-B 502 are not taken into consideration, the H-region 504 is a surrounding and nearby region of the Node-B 502 in the cell 501 while the L-region 505 is a surrounding and far region of the Node-B 502 in the cell 501, as illustrated in FIG. 5.

Figure 6:
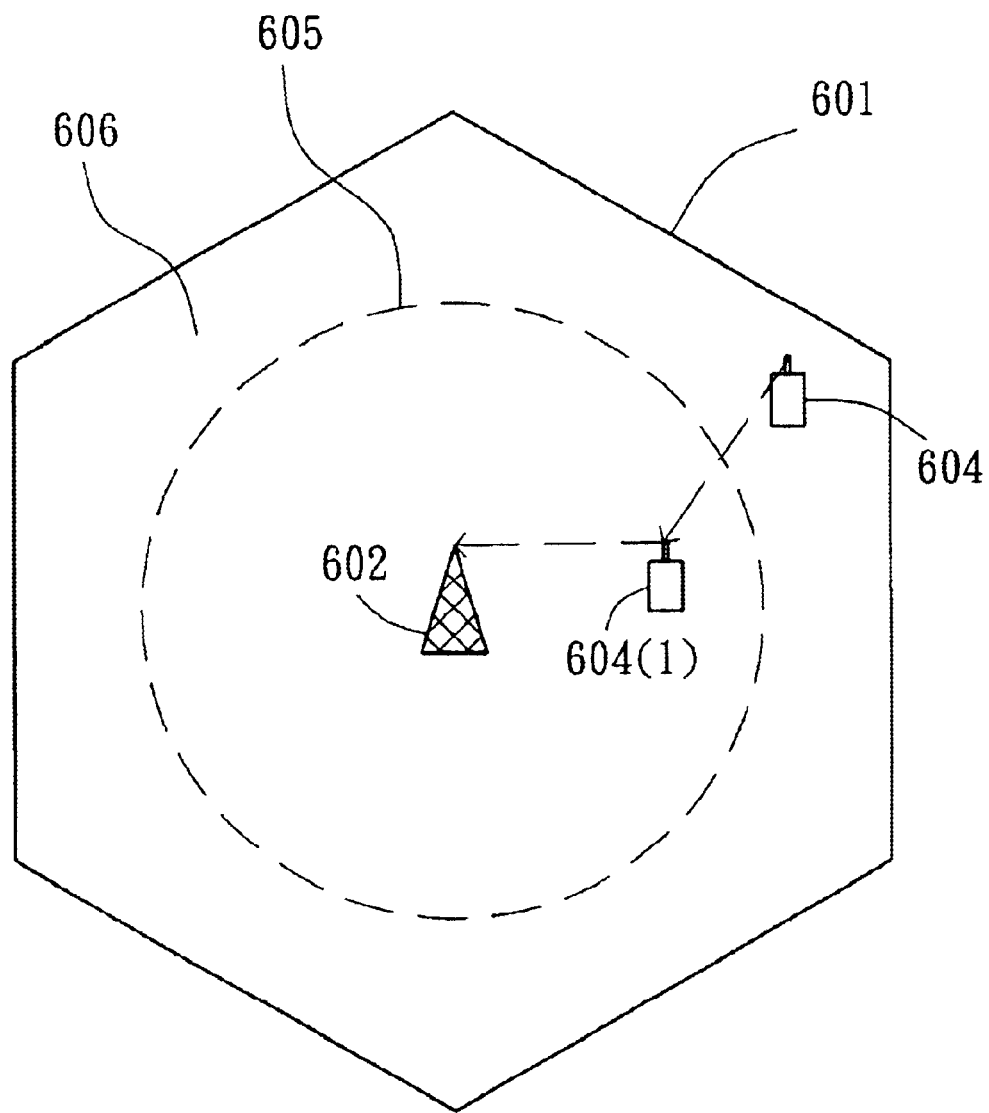
FIG. 6 illustrates that a UE performs relay transmission by using a method of relay transmission.

FIG. 6 illustrates that a UE 604 uses a method of relay transmission to perform relay transmission according to an embodiment of the invention. In this invention, every UE 604 is capable of relaying messages. When a requesting UE, for example, the UE 604(1) in cell 601 intends to send a message to the Node-B 602 at a high data rate, the requesting UE can setup a direct link to the Node-B 602 because the UE 604(1) is located at the H-region 605. If a requesting UE, for example, the UE 604 in cell 601 sends a message by using the direct transmission method, the message can only be transmitted at a low data rate because the UE 604 is located at the L-region 606. In this embodiment, the requesting UE 604 has an alternative choice to use the relay transmission method to achieve the high data rate transmission. The message originating from UE 604 can be relayed by another UE which is located at the H-region (e.g., UE 604(1)).

Figure 7:
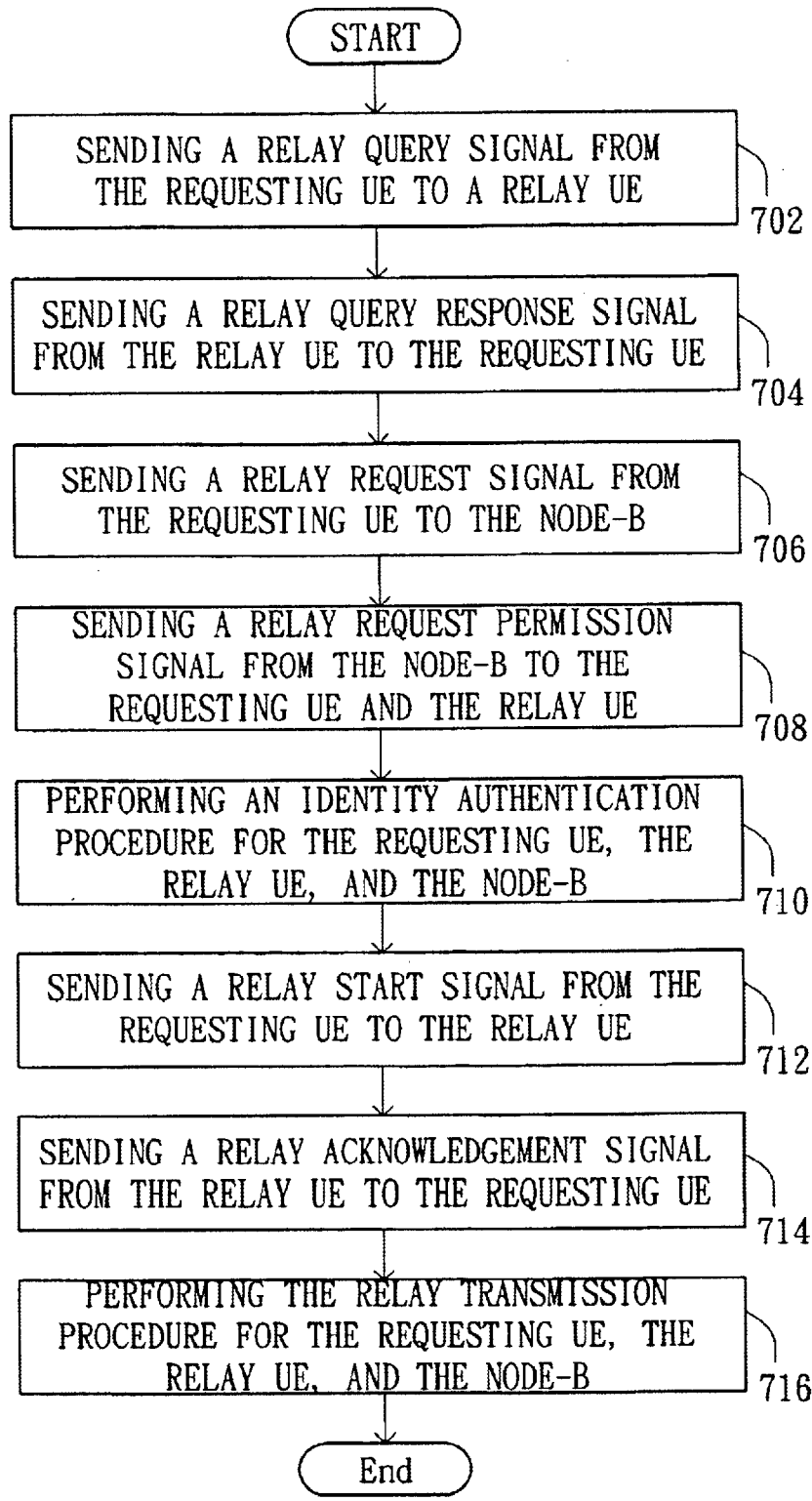
FIG. 7 illustrates that a requesting UE transmits messages by using the method of relay transmission.

FIG. 7 is a flowchart illustrating the requesting UE 604 sending messages to base station Node-B by using the relay transmission method. When the requesting UE 604 needs to send messages by using the relay transmission method, a relay request confirmation procedure is performed for the requesting UE 604 and relay UE 604(1) to confirm that the requesting UE 604 is enabled to send the message via the relay UE 604(1). The relay request confirmation procedure includes two steps. First, in step 702, the requesting UE 604 sends a relay query signal to one or more UEs in the cell 601 in order to query whether any UE that received the relay query signal relays the message. In step 704, when one UE in the cell 601 receives the relay query signal and allows the request for relaying the message, the UE sends a relay query response signal to the requesting UE 604 so as to notify the requesting UE 604 that the UE, referred to as a relay UE, allows the requesting UE 604 to send the message via the relay UE. In step 704, only the UEs located at the regions that can support higher data rate than the data rate supported by the region where the requesting UE is located can act as relay UEs.

The mobile communication system predetermines a request-waiting period for the requesting UE 604. After sending the relay query signal, the requesting UE 604 waits for any response from the other UEs. If the requesting UE 604 does not receive any response within the request-waiting period, it indicates that no UE is available for relaying the message. The requesting UE 604 may then choose to resend a relay query signal or use the direct transmission method to send messages at the low data rate directly to the Node-B 602. The relay query signal from the requesting UE 604 includes a requesting-UE identification code, a Node-B identification code, and information on the region where the requesting UE 604 resides. On receipt of the relay query signal from the requesting UE 604, the other UEs can determine whether to respond to the relay query signal or not, according to the relay parameters and information of the relay query signal. Only the UEs, which are available for relaying and are located at the regions that can support higher data rate than the data rate supported by the region where the one requesting UE is located, may decide to respond to the relay query signal with a given probability. For high subscriber density, the probability can be set to be smaller to prevent from excess responding. For low subscriber density, the probability can be set to 1 to prevent from no responding. With these criteria, the UE can avoid unnecessarily responding to the relay query signal, thus reducing influence of responding on the requesting UE.

In addition, if the requesting UE 604 receives a number of relay query response signals within the request-waiting period, the requesting UE 604 randomly selects one of the UEs that send the relay query response signals as the relay UE 604(1). Thus, when the requesting UE 604 executes the relay transmission procedure, relay transmission is performed via the relay UE 604(1).

After the requesting UE 604 receives the relay query response signal from the relay UE 604(1), a base station confirmation procedure is performed for the requesting UE 604, relay UE 604(1), and Node-B 602 to confirm that the relaying link has been successfully set up. The base station confirmation procedure includes two steps. First, in step 706, the requesting UE 604 sends a relay request signal to the Node-B 602 for requesting for the relay transmission procedure with the aid of relay UE 604(1). Next, in step 708, after receiving the relay request signal, the Node-B 602 sends a relay request permission signal to the requesting UE 604 and the relay UE 604(1) to accept the relay transmission procedure. The communication link between the requesting UE 604 and the Node-B 602 built up.

Next, step 710 is executed. An identity authentication procedure is performed by the requesting UE 604, relay UE 640(1), and Node-B 602 to establish a relay channel among the requesting UE 604, relay UE 640(1), and Node-B 602. When the relay transmission is being performed, the message sent from the requesting UE 604 is relayed by the relay UE 604(1) to the Node-B 602, via the assigned relay channel. Note that the relay channel established between the requesting UE 604, relay UE 640(1), and Node-B 602 during the identity authentication procedure is different from the control channel used for communication among the requesting UE 604, relay UE 640(1), and Node-B 602. The relay channel is used for transmitting the messages sent from the requesting UE 604 and relayed by the relay UE 604(1) to Node-B 602. The control channel is used for transmitting control signals between the requesting UE 604, relay UE 640(1), and Node-B 602.

After the relay channel is established, a relay start confirmation procedure for the requesting UE 604 and the relay UE 604(1) is executed to initiate a relay transmission procedure for the requesting UE 604 and the relay UE 604(1). The relay start confirmation procedure includes two steps. First, step 712 is executed, wherein the requesting UE 604 sends a relay start signal to notify the relay UE 604(1). Second, in step 714, on receipt of the relay start signal, the relay UE 604(1) sends a relay acknowledgement signal to the requesting UE 604 for confirmation.

Finally, step 716 is executed. In step 716, the relay transmission procedure for the requesting UE 604, the relay UE 604(1), and the Node-B 602 is performed, wherein the requesting UE 604 sends messages to the Node-B 602 via the relay UE 604(1).

In the mobile communication system, the locations of the user equipment units are changed over time. When the requesting UE 604, which performs the relay transmission procedure, moves from the L-region to the H-region, the requesting UE 604 may send the message to the base station directly without the bypass route of the relay UE 604(1). In this case, a link switching procedure to stop the relay transmission procedure and to start the direct transmission procedure maybe launched. However, the requesting UE 604 may decide not to perform the link switching procedure if the residual amount of the messages is lower than a given threshold to prevent from excess signaling effort.

Figure 8:
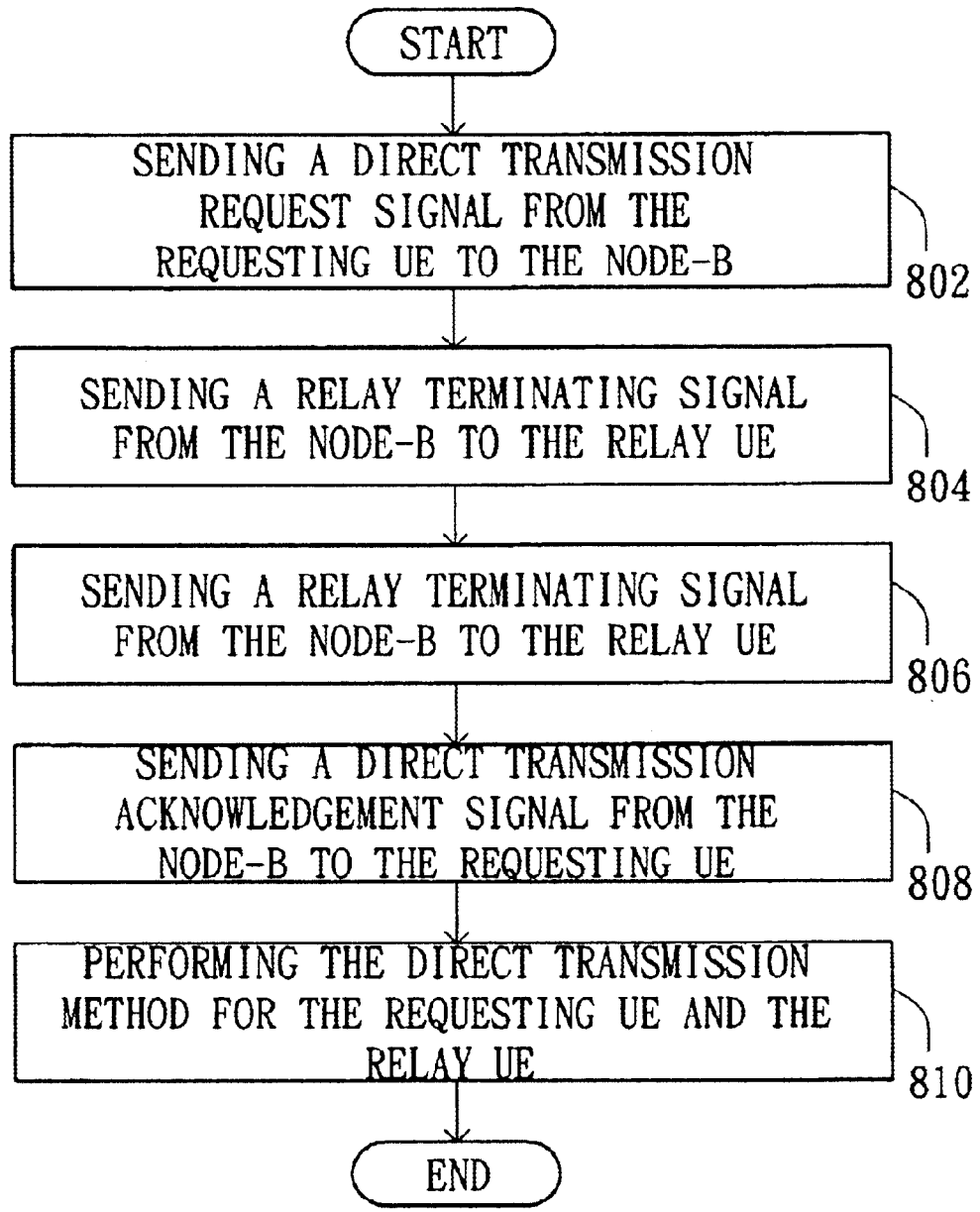
FIG. 8 is a flowchart illustrating that a requesting UE executes a link switching procedure.

FIG. 8 is a flowchart illustrating the link switching procedure if executed by the requesting UE 604. When the requesting UE 604 executes the link switching procedure, step 802 is firstly performed. In step 802, the requesting UE 604 sends a direct transmission request signal to the Node-B 602 to request for the direct transmission.

After the Node-B 602 receives the direct transmission request signal, a relay terminating procedure for the Node-B 602 and the relay UE 604(1) is performed to tear down the relay channel. The relay terminating procedure includes two steps. First, step 804 is executed, wherein the Node-B 602 sends a relay-terminating signal to the relay UE 604(1) to request the relay UE 604(1) to terminate the relay transmission procedure. Next, in step 806, on receipt of the relay-terminating signal, the relay UE 604(1) sends a relay termination acknowledgement signal to the Node-B 602 to confirm that the relay UE 604(1) has terminated the relay transmission procedure.

After the relay terminating procedure has been executed, the Node-B 602 sends a direct transmission acknowledgement signal to the requesting UE 604 to notify the start of direct transmission procedure, as shown in step 808. Finally, on receipt of the direct transmission acknowledgement signal, the requesting UE 604 executes the direct transmission procedure to send messages to the Node-B 602 directly, as shown in step 810.

During the relay transmission, either the requesting UE 604 or the relay UE 604(1) should use a link detection procedure to detect the availability of the relay channel. If the relay channel is lost due to the movement of the requesting UE 604 or the relay UE 604(1), the requesting UE 604 executes a relay link re-establishment procedure to search for another relay UE to continue the relay transmission procedure. The link detection procedure for the requesting UE 604 and the relay UE 604(1) will be described in the following.

Figure 9:
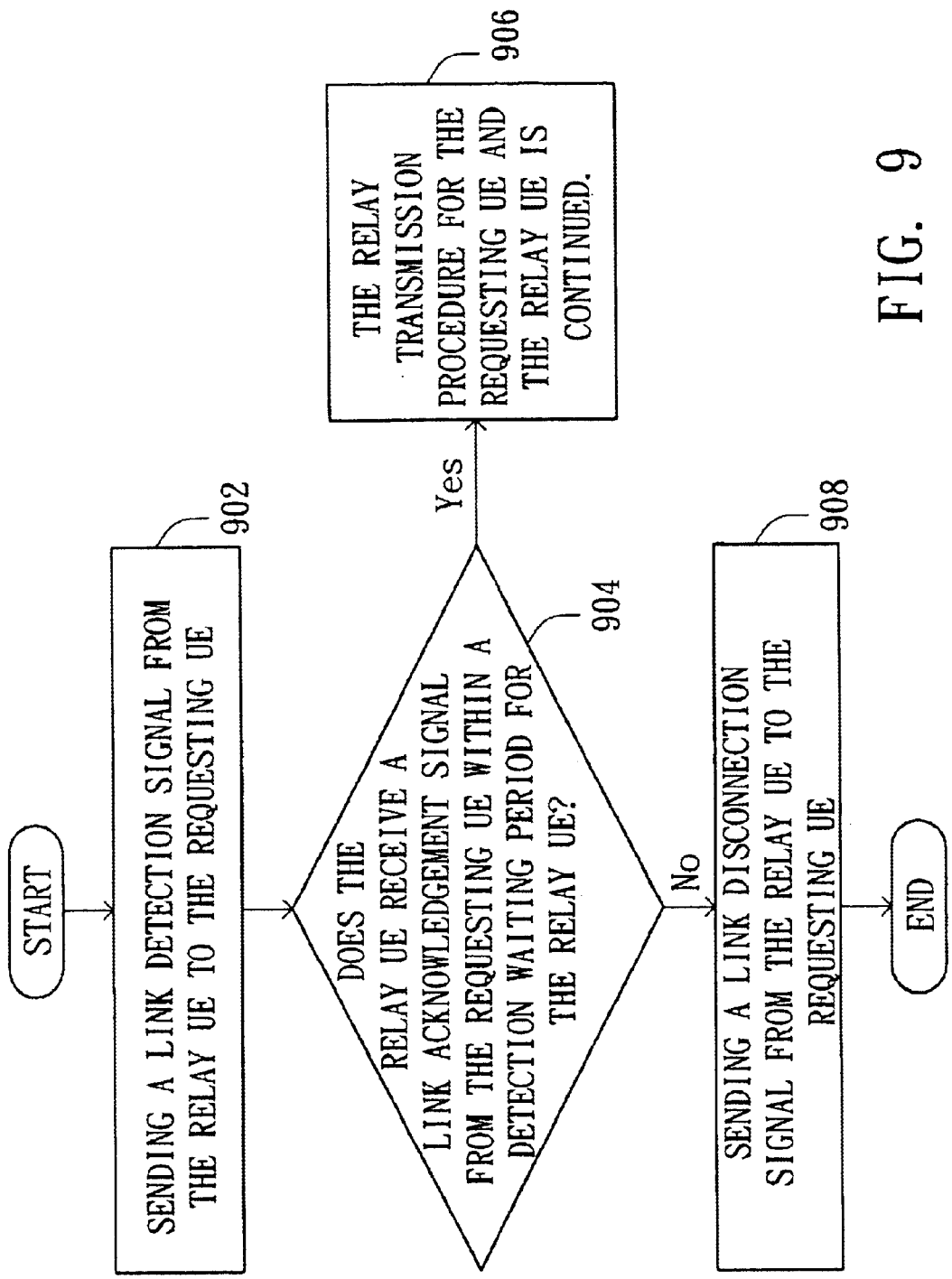
FIG. 9 is a flowchart illustrating a link detection procedure used by a relay UE.

FIG. 9 is a flowchart illustrating the link detection procedure performed by the relay UE 604(1) during the relay transmission. In step 902, the relay UE 604(1) sends a link detection signal to the requesting UE 604 to indicate that the relay UE is still alive. A timer, which is set to be a predefined detection-waiting period, is activated immediately at the relay UE 604(1) side. In step 904, the relay channel is marked as available if the relay UE 604(1) receives a link acknowledgement signal from the requesting UE 604 before the timer expiry. In this case, the relay transmission procedure for the requesting UE 604 and the relay UE 604(1) continues, as shown in step 906. Otherwise, the relay channel is marked as lost and the relay UE 604(1) should stop the relay transmission procedure immediately. If the requesting UE 604 can automatically identify the lost of relay channel when it does not receive the link detection signal from the relay UE 604(1) within a predefined time period, the time period can be set to be the same as that used by the relay UE 604(1) to perform the link detection procedure. Otherwise, the relay UE 604(1) will attempt to notify the requesting UE 604 of the lost of relay channel by sending a link disconnection signal to the requesting UE 604 via common control channel, in step 908.

Figure 10:
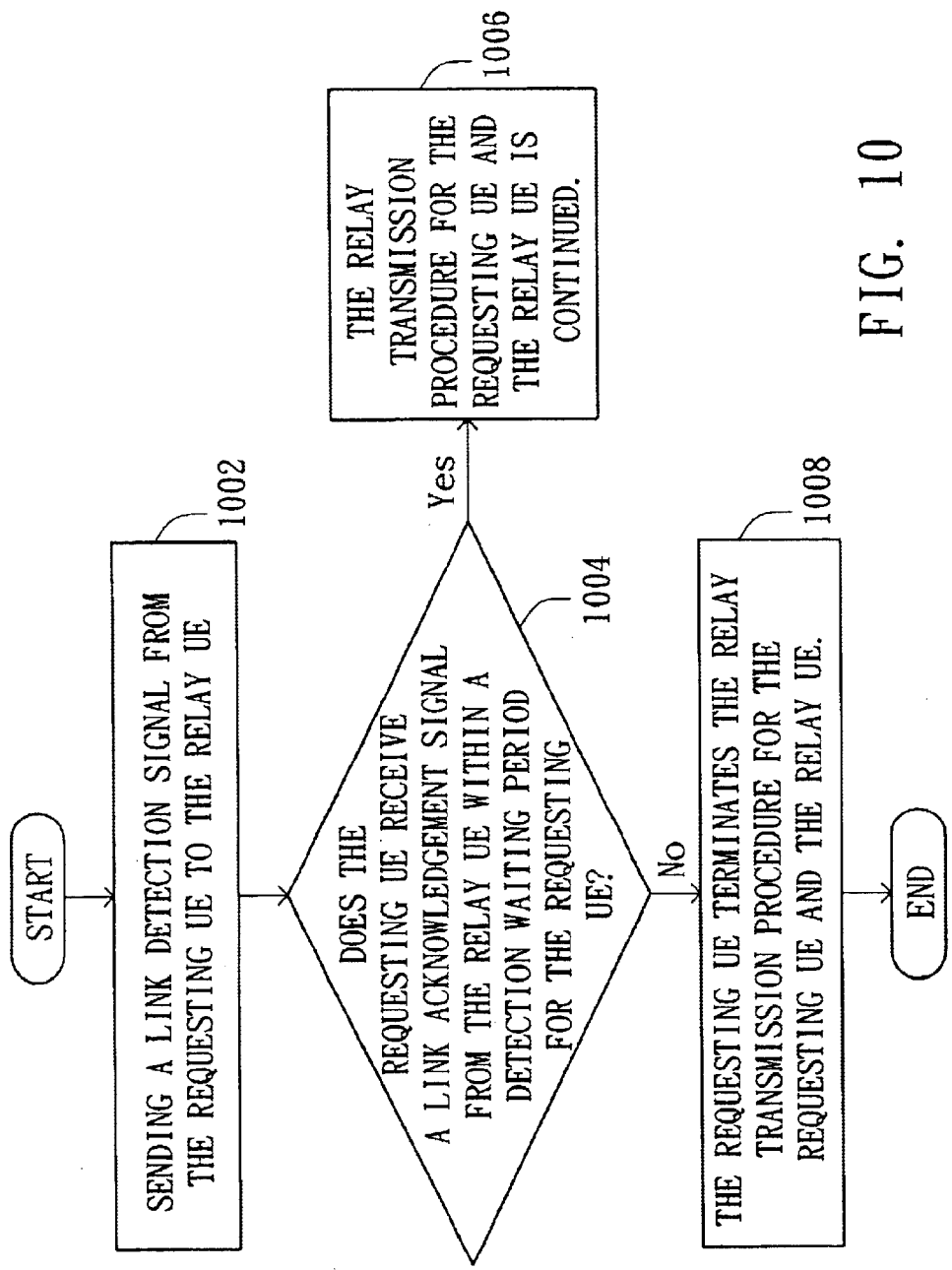
FIG. 10 is a flowchart illustrating a link detection procedure used by a requesting UE.

The similar procedure executed by the requesting UE 604 during the relay transmission is illustrated in FIG. 10. In step 1002, the requesting UE 604 sends a link detection signal to the relay UE 604(1) to indicate that the requesting UE is still alive. A timer, which set to be a predefined detection-waiting period, is activated immediately at the requesting UE 604 side. In step 1004, the relay channel is marked as available if the requesting UE 604 receives a link acknowledgement signal from the relay UE 604(1) before the timer expiry. In this case, the relay transmission procedure for the requesting UE 604 and the relay UE 604(1) continues, as shown in step 1006. Otherwise, the relay channel is marked as lost and the requesting UE 604 should stop the relay transmission procedure immediately. If the relay UE 604(1) can automatically identify the lost of relay channel when it does not receive the link detection signal from the requesting UE 604 within a predefined time period, the time period can be set to be the same as that used by the requesting UE 604 to perform the link detection procedure. Otherwise, the requesting UE 604 will attempt to notify the relay UE 604(1) of the lost of relay channel by sending a link disconnection signal to the relay UE 604(1) via common control channel, in step 1008.

Figure 11:
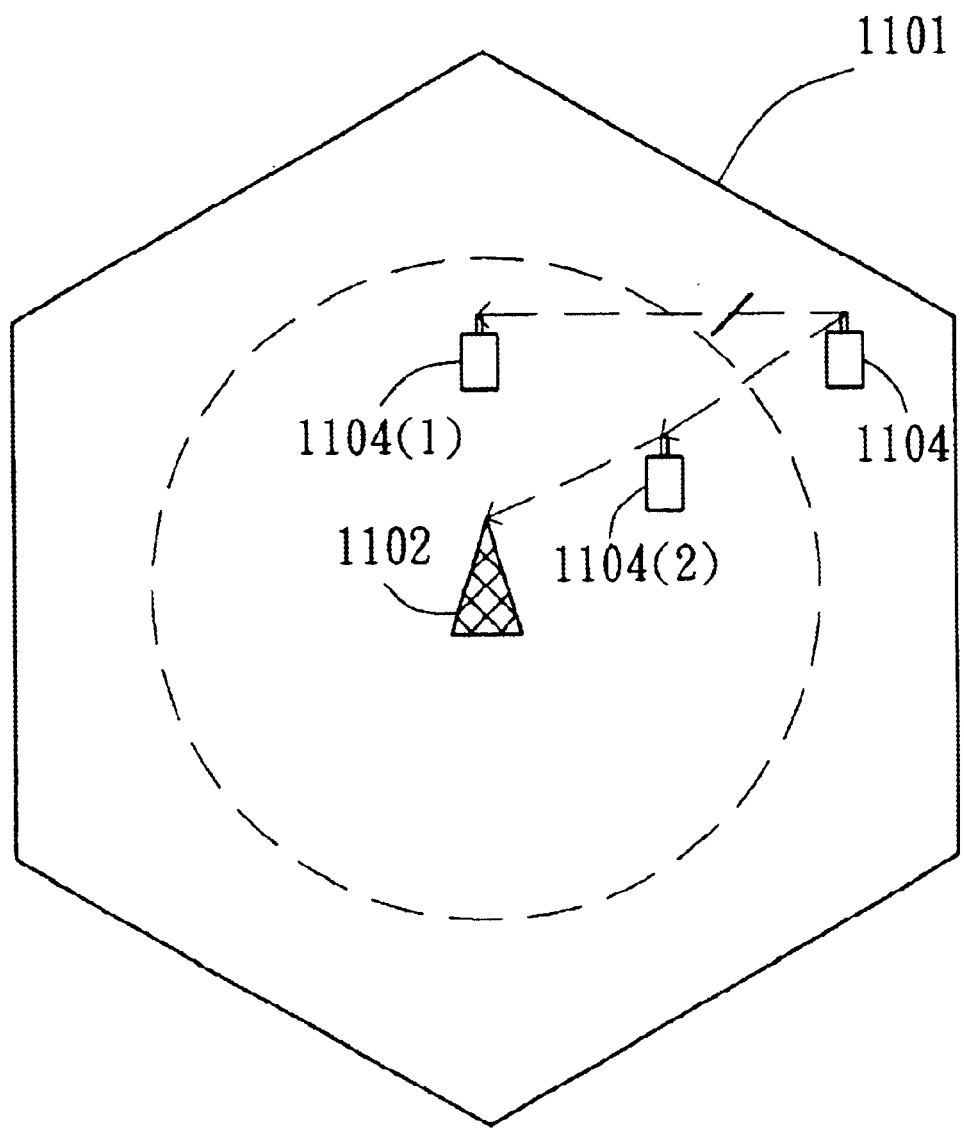
FIG. 11 illustrates that a requesting UE performs a relay transmission procedure via another relay UE.

FIG. 11 illustrates that a requesting UE 1104 chooses a new relay UE 1104(2) to perform relay transmission. The relay transmission procedure is stopped when the relay channel is marked as lost. In this case, the requesting UE 1104 uses the relay link re-establishment procedure to search for the new relay UE 1104(2). The requesting UE 1104 can continue to execute the relay transmission via the new relay UE 1104(2).

Figure 12:
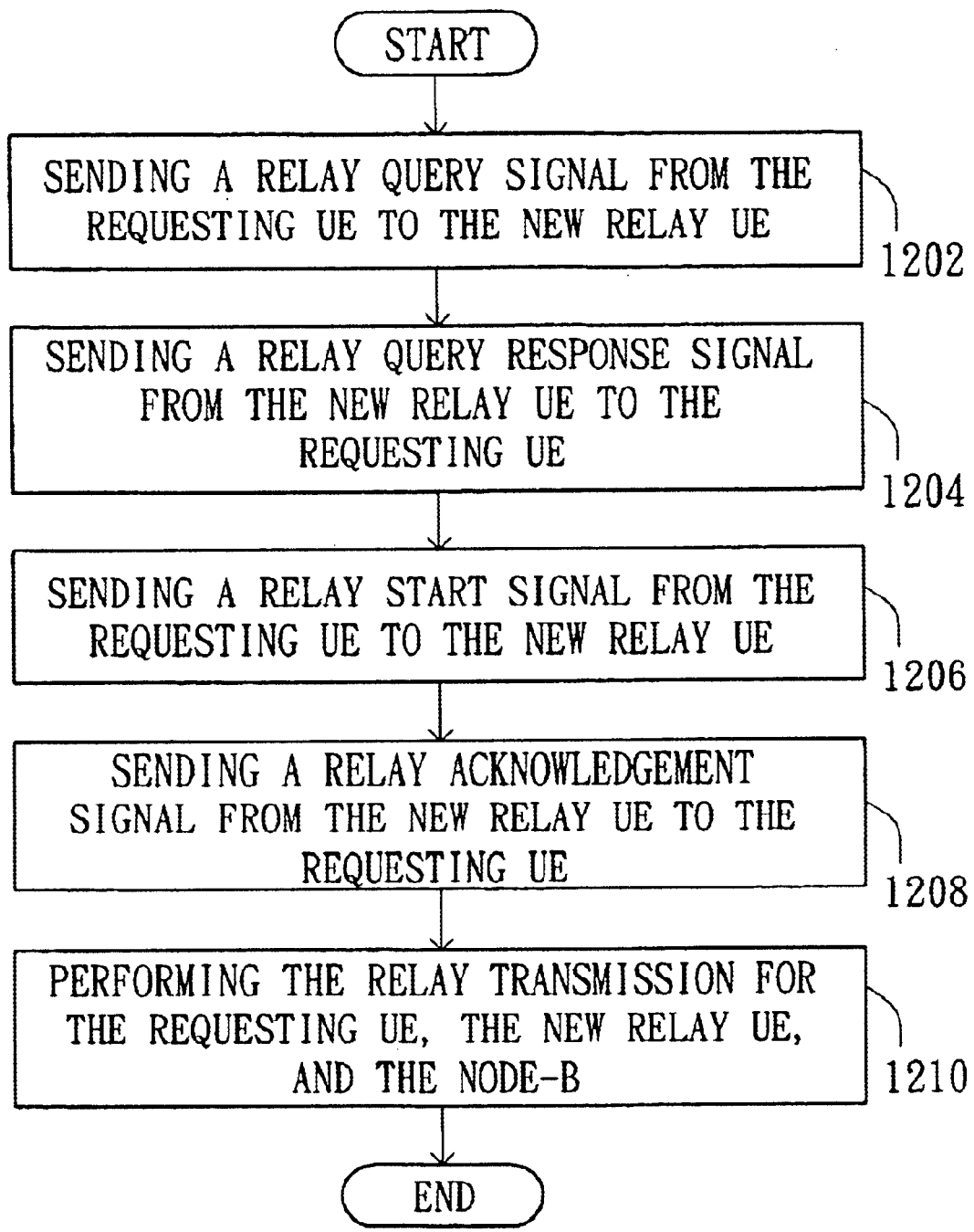
FIG. 12 is a flowchart illustrating a relay link re-establishment procedure that a requesting UE executes.

FIG. 12 is a flowchart describing the relay link re-establishment procedure initiated by the requesting UE 1104. When the requesting UE 1104 decides to begin the relay link re-establishment procedure, a relay request confirmation procedure for the requesting UE 1104 and the new relay UE 1104(2) is performed to confirm that the requesting UE 1104 is allowed to execute a relay transmission procedure via the new relay UE 1104(2). The relay request confirmation procedure for the requesting UE 1104 and the new relay UE 1104(2) is identical to that for the requesting UE 1104 and the relay UE 1104(1) before the previous relay transmission. First, in step 1202, the requesting UE 1104 sends a relay query signal to the new relay UE 1104(2) to request for the relay transmission via the new relay UE 1104(2). On receipt of the relay query signal, the new relay UE 1104(2) sends a relay query response signal to the requesting UE 1104 to confirm the setup of the relay channel, as indicated in step 1204.

Note that a relay channel between the requesting UE 1104, relay UE 1140(1), and Node-B 1102 is established since the identity authentication procedure for the requesting UE 1104, the relay UE 1104(1), and the Node-B 1102 has been performed. Thus, when relay transmission for the requesting UE 1104, the relay UE 1104(1), and the Node-B 1102 is to be performed, messages can be transmitted through the previously established relay channel and thus it does not have to execute the identity authentication procedure for the requesting UE 1104, the relay UE 1104(2), and the Node-B 1102.

After the execution of the relay request confirmation procedure for the requesting UE 1104 and the new relay UE 1104(2), a relay start confirmation procedure for the requesting UE 1104 and the new relay UE 1104(2) is performed to confirm that relay transmission is ready to be started. The relay start confirmation procedure for the requesting UE 1104 and the new relay UE 1104(2) is identical to that performed by the requesting UE 1104 and the relay UE 1104(1). In step 1206, the requesting UE 1104 sends a relay start signal to the new relay UE 1104(2) to request the new relay UE 1104(2) to start the relay transmission. After receiving the relay start signal, in step 1208, the new relay UE 1104(2) sends a relay acknowledgement signal to the requesting UE 1104 to confirm that the relay transmission procedure is ready to be started.

Finally, in step 1210, the relay transmission for the requesting UE 1104, the new relay UE 1104(2), and the Node-B 1102 is performed, wherein the requesting UE 1104 transmits messages to the Node-B 1102 via the new relay UE 1104(2).

The method of relay transmission in a mobile communication system disclosed above has the advantages as follows:

1. Enhancing communication efficiency and quality. The invention discloses that a requesting UE is capable of sending messages via one or more relay UEs to a base station. The distance between the requesting UE and the base station is smaller than that between the relay UE and the base station, and therefore, higher data rate can be achieved by introducing the relay UE. In the conventional mobile communication system, on the other hand, if the mobile station is distant from the base station or there is a barrier between the mobile station and the base station, only low data rate transmission can be achieved. Compared the conventional transmission method in such conventional communication system, the invention can achieve high data rate transmission between the requesting UE and the base station and can improve communication quality.

2. Increasing data transmission rate and improving communication quality with reduced number of base stations and thus saving the cost for base-station establishment. Conventionally, to increase data transmission rate or improve communication quality, the mobile communication system needs to install more base stations to improve service quality, wherein a cell is divided into a number of microcells. However, installation of the base stations of microcells costs a certain amount of money. In this invention, messages from the requesting UE can be relayed by the relay UE to the base station and transmitter with a high data rate. Therefore, the problems of the conventional method can be avoided.

3. Increasing economic benefits. The structure having microcells is generally applied to populous urban areas because subscriber density and utilization of mobile communication in the populous urban areas is larger than that in other areas. In order to increase data transmission rate and improve communication quality in the non-urban areas, the method of relay transmission of the invention can be applied. The mobile communication service providers can apply the invention to their systems to achieve high data rate transmission and better communication quality at a lower cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of relay transmission for a mobile communication system, the mobile communication system including a base station, a first user equipment unit (UE), and a second user equipment unit (UE), the method comprising:

determining whether a first transmission rate of the first UE is lower than a threshold value, and if yes, proceeding the following steps;

performing a relay request confirmation procedure for the first UE and the second UE so as to confirm that the first UE is enabled to send a message via the second UE;

performing a base station confirmation procedure for the first UE, the second UE, and the base station so as to confirm that the base station permits the first UE to send the message via the second UE to the base station;

performing an identity authentication procedure for the first UE, the second UE, and the base station so as to establish a relay channel;

performing a relay start confirmation procedure for the first UE and the second UE so as to confirm that a relay transmission procedure for the first UE and the second UE is allowed to be performed; and performing the relay transmission procedure for the first UE, the second UE, and the base station, wherein the first UE sends the message to the base station via the second UE at a relay transmission rate, which is higher than the first transmission rate.

2. The method of relay transmission according to claim 1, wherein the first and the second UEs are capable of relaying messages.

3. The method of relay transmission according to claim 1 further comprising:

sending a measurement signal by the base station; and determining the first and the second transmission rates by the measurement signal.

4. The method of relay transmission according to claim 1, wherein the relay request confirmation procedure comprises the steps of:

sending a relay query signal from the first UE to the second UE in order to request the second UE to relay the message; and sending a relay query response signal from the second UE to the first UE in order to notify the first UE that the second UE allows the first UE to send the message via the second UE.

5. The method of relay transmission according to claim 1, wherein the base station confirmation procedure comprises the steps of:

sending a relay request signal from the first UE to the base station in order to request the base station to allow the first UE to perform the relay transmission procedure via the second UE; and sending a relay request permission signal from the base station to the first UE and the second UE in order to allow the first UE to perform the relay transmission procedure via the second UE.

6. The method of relay transmission according to claim 1, wherein the first mobile identifies the first and the second transmission rates by a measurement signal sent by the base station.

7. The method of relay transmission according to claim 1, wherein the relay request confirmation procedure comprises the steps of:

sending a relay query signal from the first UE to the second UE so as to request the second UE to relay the message;

the first UE waiting for a predetermined waiting period and if receiving no relay query response signal, the first UE resending a relay query signal to the second UE.

8. The method of relay transmission according to claim 1, wherein the base station confirmation procedure comprises the steps of:

sending a relay request signal from the first UE to the base station so as to request the base station to permit the first UE to perform a relay transmission procedure with the second UE; and after the base station receives the relay request signal, sending a relay request permission signal from the base station to the first UE and the second UE so as to permit the first UE to perform the relay transmission procedure with the second UE.

9. The method of relay transmission according to claim 1, wherein the identity authentication procedure comprises the steps of:
sending an identity authentication signal from the first UE to the base station as to query the base station whether the identity of the first UE is allowed to send the message; and
after the base station receives the identity authentication signal, sending an identity authentication signal from the base station to the first UE so as to notify the first UE that the first UE is authenticated and authorized to send the message.

10. The method of relay transmission according to claim 1, wherein the relay start confirmation procedure comprises the steps of:
sending a relay start signal from the first UE to the second UE so as to query the second UE whether the relay transmission procedure is allowed to start; and
after the second UE receives the relay start signal, sending a relay acknowledgement signal from the second UE to the first UE so as to notify the first UE that the relay transmission procedure is ready to start.

11. The method of relay transmission according to claim 3, wherein when the first UE is performing the relay transmission procedure and moves around the base station, as the first UE receiving the measurement signal and capable of using a higher transmitting rate than the transmitting rate of the second UE, the first UE performing a link switching procedure for stopping the relay transmission procedure and then using a direct transmission method to transmit the message, the link switching procedure comprising the steps of:
sending a direct transmission request signal from the first UE to the base station to query the base station whether the first UE is allowed to use the direct transmission method to transmit the message;
performing a relay terminating procedure for the base station and the second UE so as to confirm that the second UE terminates the relay transmission procedure;
sending a direct transmission acknowledgement signal from the base station to the first UE so as to notify the first UE that the first UE is allowed to use the direct transmission method to transmit the message; and
after the first UE receives the direct transmission acknowledgement signal, sending the message from the first UE by using the direct transmission method.

12. The method of relay transmission according to claim 11, wherein the relay terminating procedure comprises the steps of:
after the base station receives the direct transmission request signal, sending a relay-terminating signal from the base station to the second UE so as to request the second UE to terminate the relay transmission procedure; and
after the second UE receives the relay-terminating signal, sending a relay termination acknowledgement signal from the second UE to the base station so as to notify the base station that the second UE terminates the relay transmission procedure.

13. The method of relay transmission according to claim 1, wherein when the first UE uses the method of relay transmission to transmit the message, the first UE further executes a link detection procedure to confirm whether the relay transmission procedure for the first UE and the second UE is able to be continued, the link detection procedure comprising the steps of:
sending a link detection signal from the first UE to the second UE so as to confirm that the first UE is to continue to execute the relay transmission procedure via the second UE;
if the first UE receives a link acknowledgement signal from the second UE within a detection-waiting period for the first UE, continuing the relay transmission procedure for the first UE and the second UE; and
if the first UE does not receive the link acknowledgement signal from the second UE within the detection-waiting period for the first UE, terminating the relay transmission procedure for the first UE and the second UE.

14. The method of relay transmission according to claim 1 wherein when the second UE executes the relay transmission procedure, the second UE further executes a link detection procedure to confirm whether the second UE needs to continue to execute the relay transmission procedure, the link detection procedure comprising the steps of:
sending a link detection signal from the second UE to the first UE so as to confirm that the second UE is to continue to execute the relay transmission procedure;
if the second UE receives a link acknowledgement signal from the first UE within a detection-waiting period for the second UE, continuing the relay transmission procedure for the first UE and the second UE; and
if the second UE does not receive the link acknowledgement signal from the first UE within the detection-waiting period for the second UE, terminating the relay transmission procedure at the second UE and sending a link disconnection signal to the first UE so as to notify the first UE that the relay channel has been disconnected.

15. The method of relay transmission according to claim 13, wherein when the first UE does not receive the link acknowledgement signal from the second UE within the detection-waiting period, the first UE executes a relay link re-establishment procedure to search for another user equipment unit as a new relay user equipment unit (UE), and continues to execute the relay transmission procedure via the new relay UE, the relay link re-establishment procedure comprising the steps of:
performing a relay request confirmation procedure for the first UE and the new relay UE so as to confirm that the first UE is allowed to execute the relay transmission procedure via the new relay UE;
performing a relay start confirmation procedure for the first UE and the new relay UE so as to confirm that the relay transmission procedure is ready to be started; and
performing the relay transmission procedure for the first UE, the new relay UE, and the base station.

16. The method of relay transmission according to claim 15, wherein the relay request confirmation procedure comprises the steps of:
sending a relay query signal from the first UE to the new relay UE so as to request the new relay UE that the first UE executes the relay transmission procedure via the new relay UE; and
after the new relay UE receives the relay query signal, sending a relay query response signal from the new relay UE to the first UE so as to notify the first UE that the new relay UE allows the first UE to execute the relay transmission procedure via the new relay UE.

17. The method of relay transmission according to claim 15, wherein the relay start confirmation procedure comprises the steps of:

sending a relay start signal from the first UE to the new relay UE in order to notify the new relay UE that the relay transmission procedure is allowed to start; and after the new relay UE receives the relay start signal, sending a relay acknowledgement signal from the new relay UE to the first UE in order to notify the first UE that the relay transmission procedure is ready to start.

18. The method of relay transmission according to claim 1, the mobile communication system further comprising a plurality of the second UEs, the method further comprising:

selecting one from the plurality of the second UEs, the selected second UE having a second transmission rate higher than the first transmission rate.

19. A method of relay transmission for a first user equipment unit (UE) in a mobile communication system which further including a base station and a plurality of second user equipment units (UEs), the first UE communicating with the base station at a first transmission rate, the method comprising:

selecting one from the second UEs, the selected second UE communicating with the base station at a second transmission rate, the second transmission rate being higher than the first transmission rate;

requesting the selected second UE to allow the first UE to transmit a message via the selected second UE;

requesting the base station to allow the first UE to transmit the message to the base station via the selected second UE; and transmitting the message by the first UE to the base station via the selected second UE at a third transmission rate, the third transmission being higher than the first transmission rate.

20. The method of relay transmission according to claim 19, wherein the first mobile identifies the first and the second transmission rates by a measurement signal sent by the base station.

* * * * *

UNITED STATES PATENT AND TRADEMARK OFFICE
CERTIFICATE OF CORRECTION

PATENT NO. : 6,954,612 B2  Page 1 of 1
DATED : October 11, 2005
INVENTOR(S) : Ray-Guang Cheng et al.

It is certified that error appears in the above-identified patent and that said Letters Patent is hereby corrected as shown below:

<u>Title page, Item [54] and Column 1, line 1,</u>
Title, should read:
-- METHOD FOR RELAY TRANSMISSION IN A MOBILE COMMUNICATION SYSTEM --.

Signed and Sealed this

Seventh Day of February, 2006

JON W. DUDAS
*Director of the United States Patent and Trademark Office*